United States Patent [19]

Bayha et al.

[11] Patent Number: 5,318,853
[45] Date of Patent: Jun. 7, 1994

[54] ADHESIVE POLYESTER PREPOLYMER WHICH DOES NOT ETCH POLYCARBONATE SHEETS, AND METHOD OF PREPARING SAME

[75] Inventors: Charles E. Bayha; H. Arne Sudlow, both of Collierville, Tenn.

[73] Assignee: Resikast Corporation, Collierville, Tenn.

[21] Appl. No.: 916,714

[22] Filed: Jul. 22, 1992

[51] Int. Cl.$^5$ .................. C08F 283/00; B32B 9/00; C08G 63/02

[52] U.S. Cl. .................. 428/431; 428/430; 525/445; 525/446; 528/272; 528/306; 528/301; 528/308; 528/299

[58] Field of Search .............. 428/430, 431; 525/445, 525/446; 528/272, 306, 308, 301, 299

[56] References Cited

U.S. PATENT DOCUMENTS

| | | |
|---|---|---|
| 1,937,396 | 11/1933 | Watkins . |
| 3,334,008 | 8/1967 | Park et al. . |
| 3,509,015 | 4/1970 | Wismer et al. . |
| 3,522,142 | 7/1970 | Wismer et al. . |
| 3,531,346 | 9/1970 | Jameson . |
| 3,546,064 | 12/1970 | Hamilton et al. . |
| 3,700,761 | 10/1972 | O'Driscoll et al. ............. 264/1 |
| 3,947,620 | 3/1976 | Plant et al. . |
| 4,094,835 | 6/1978 | Omori et al. ............. 525/7.1 |
| 4,125,669 | 11/1978 | Triebel et al. . |
| 4,131,635 | 12/1978 | Wilschut ............. 525/170 |
| 4,234,533 | 11/1980 | Langlands . |
| 4,299,639 | 11/1981 | Bayer . |
| 4,724,023 | 2/1988 | Marriott . |
| 4,756,938 | 7/1988 | Hickman . |
| 4,866,338 | 9/1989 | Ishigaki et al. ............. 313/478 |
| 4,923,756 | 5/1990 | Chung et al. ............. 428/423.7 |
| 5,096,980 | 3/1992 | Yamazaki et al. ............. 525/438 |

FOREIGN PATENT DOCUMENTS 1516869 7/1978 United Kingdom .
2155856 10/1985 United Kingdom .

OTHER PUBLICATIONS

"Handbook of Chemistry and Physics" 55th ed. 1974-1975, CRC.

*Primary Examiner*—John Kight, III
*Assistant Examiner*—T. Mosley
*Attorney, Agent, or Firm*—Spencer, Frank & Schneider

[57] ABSTRACT

This invention relates to multiple glass/plastic laminates for ballistic resistant and security applications. The laminates typically comprise a glass lite and a plastic sheet, such as polycarbonate, bonded with an adhesive based on a novel solvent free thermosetting alkyd resin. Subsequent layers can be polycarbonate sheets and/or acrylic sheets and glass lites with the adhesive layer separating the lites and sheets.

The resin developed specifically for this application is an unsaturated polyester designed to be highly flexible, tough, low exotherm and compatible with t-butyl styrene. This monomer is unique in that it does not etch acrylic or polycarbonate sheets.

Further, this invention relates to a vertical liquid pour process which enables the rapid manufacture of bullet resistant glass/plastic laminates without the need for expensive ultra-violet or heat curing ovens. The adhesive cures at temperatures ranging from 60° F. to 90° F. High temperature and high pressure treatments are unnecessary. Laminates produced in this manner with adhesive interlayer will pass all intended ballistic or security tests within a 12 hour period.

12 Claims, No Drawings

ADHESIVE POLYESTER PREPOLYMER WHICH DOES NOT ETCH POLYCARBONATE SHEETS, AND METHOD OF PREPARING SAME

FIELD OF THE INVENTION

This invention relates to the fabrication of multiple glass/plastic laminates for ballistic resistant and security applications.

TECHNOLOGY REVIEW

Glass laminates as related to the ballistic and security applications involve the construction of alternate layers of glass lites and plastic sheets with an adhesive interlayer. For the most part the interlayer has been a meltable film based on polyvinyl butylal. This polymer film has been the basis of substantially all safety glass applications in automobile windshields and commercial/residential windows requiring impact resistance. In some areas, however, problems exist that made the use of polyvinyl butyral film difficult at best.

Originally, bullet resistant glass consisted primarily of alternating layers of glass lites ranging in thickness from ⅛" to ⅜" and polyvinyl butyral film, that was 30 to 90 mils in thickness. Since the film contains 30% plastizer, the film rolls must be kept cool prior to use. The film is cut to the desired shape and placed between two lites of glass. The glass/film/glass composite is run through an oven in order to melt the film. Entrained air in the film is removed at this point by either vacuum or by roll compression. About 95% of the air is removed at this stage. The laminate is now subjected to 240°-300° F. temperature and 150-200 lb/sq. in. pressure in an autoclave to dissolve residual air, maintain film thickness and to achieve acceptable adhesion to glass. The production of multilayers of glass lites held together with polyvinyl butyral film is difficult at best.

With the introduction of tough, new plastics such as polycarbonate and acrylic sheets to replace some of the glass lites in order to produce light weight bullet resistant laminates, the problem associated with the use of polyvinyl butyral (P.V.B.) in multilayer applications became more severe. Adhesion of P.V.B. to the polycarbonate surface is marginal at best and delamination with time can occur. The high temperatures and pressures of the autoclave also can deteriorate the optical properties of the polycarbonate sheet. Alternative film development based on polyurethane has been commercialized and is currently offered as a replacement for P.V.B. in bullet resistant glass clad/polycarbonate composites. Although the adhesion to the polycarbonate has improved and impact strength is superior, air entrainment and increased costs vs. P.V.B. are disadvantages. Since the autoclave is still required, visual distorting of polycarbonates still can occur. Alternate urethane chemistry involves the application of a liquid, curable interlayer. In one case, the mix is comprised of two components—an isocyanate prepolymer and a polyol crosslinker. Advantages of this system is high temperatures and high pressures treatment are not necessary.

Adhesion to the polycarbonate sheet is acceptable but the disadvantage is the removal of air when the liquid mix is introduced between the glass and polycarbonate sheets. Nominal thickness for bullet resistant glass clad polycarbonate sheets is 20-40 mils. A liquid mix with a viscosity greater than 200 cps. at 75° F. is extremely difficult to introduce in this space and at the same time remove entrained air. Other versions of urethane/acrylate modifications or methacrylate base liquid adhesives either etch the polycarbonate sheets or have severe air inhibition cure problems.

Unsaturated polyester resin systems have been used as liquid adhesives especially for television tube glass laminates. These types of resins can be formulated to have acceptable impact and energy absorbing properties for bullet resistant applications, but the major monomer employed in these types systems is styrene and styrene severely etches the surface of polycarbonate sheet, thus destroying the optical properties.

There have been prior patents regarding methods of making laminated glass using a liquid thermosetting resin. Two United States patents, U.S. Pat. No. 3,703,425 to Delmonte and U.S. Pat. No. 4,234,533 to Langlands describe procedures for fabricating glass laminates using liquid thermosetting adhesives.

In the process described in the Delmonte patent, a flat glass lite is bowed in the center with a suction cup. Porous, double sided tape is applied at the edges of the glass. A second piece of glass is laid on top of the first. The double sided tape then seals the two pieces of glass together with a pool of resin between the lites in the center. The function of the tape is resin containment, thickness control and an outlet for entrapped air. A vacuum is applied around the glass lite. Air is removed through the tape pulling the resin to the tape. The glass laminate now remains flat until the liquid adhesive polymerizes to a solid.

In the process described in the Langlands patent, two lites of glass are adhered together with double sided porous tape at the edge on three sides. The fourth side is taped only on the edge of the lower plate. The protective film is partially removed. The two glass lites are fixed at a 45° angle. The resin is now introduced into a space between the lites. With ⅛" glass lites, the glass bows to accommodate the resin. As the glass composite is lowered to a flat position the resin fills the void with the entrained air escaping at the fourth side. Removal of the protective film allows the laminate to be completely sealed. Any remaining trapped air can be removed by applying pressure to the surface of the laminate. The entrained air either escapes through the porous tape or is removed with a needle syringe.

In order to produce liquid laminating adhesives, for ballistic application, it is necessary to define exactly what the ideal product would look like. The liquid product should have the following properties:

1. The resin should be clear in color, preferably as close to water white as possible.
2. Viscosity must be low to allow entrained air to escape but not so low as to allow leakage through the tape (50-150 cps ).
3. Refractive index of the resin should be slightly lower than that of float glass or the plastic sheet so that upon complete cure, the casting becomes essentially invisible to the glass and plastic interlayers.
4. Reactive profile of the resin should be stable for at least a year.
5. Monomer content should be as low as viscosity constraints allow to minimize shrinkage and air cure inhibition.
6. Number of components that need to be mixed should not be greater than two to minimize cost of dispensing equipment.
7. Reaction time initiation should be versatile and curing time as rapid as conditions will allow.

8. Resin must not etch or distort the surface of plastic interlayers.

9. Resin cost should allow a competitive advantage.

Cure casting properties must have the following properties:

a. Excellent adhesion to glass and plastic subtracts under a variety of temperature and humidity conditions.

b. Energy absorbing properties to disperse energy from an impact.

c. Excellent shear and tear resistance to resist rupture from broken glass.

d. Excellent visual and light transmission properties.

e. Non-yellowing resistance to ultra-violet light with time.

f. Ability to maintain impact properties at low and elevated temperatures.

g. Cure should proceed at ambient temperatures to eliminate the need for expensive ultra-violet cure oven, heat cure oven, and high pressure autoclaves.

h. Fire retardant properties desirable for attack glass application.

i. Casting should screen out 99+ percent of ultra-violet light.

It is the object of this patent to describe such a novel and unique resin adhesive and to describe a simple yet effective procedure for fabrication of glass clad/polycarbonate and acrylic bullet resistant laminates.

SUMMARY OF THE INVENTION

This invention relates to multiple glass/plastic laminates for ballistic resistant and security applications. The laminates typically comprise a glass lite and a plastic sheet, such as polycarbonate, bonded with an adhesive based on a novel solvent free thermosetting alkyd resin. Subsequent layers can be polycarbonate sheets and/or acrylic sheets and glass lites with the adhesive layer separating the lites and sheets.

This invention further relates to the liquid adhesive which when cured is visually clear, impact resistant, and capable of adhering to both the glass lite and the polycarbonate and/or acrylic sheet without etching or distorting the surface of the sheet. In addition, the cured adhesive is energy absorbing and has a refractive index as close as possible to the refractive index of glass and the plastic sheet.

The resin developed specifically for this application is an unsaturated polyester designed to be highly flexible, tough, low exotherm and compatible with t-butyl styrene. This monomer is unique in that it does not etch acrylic or polycarbonate sheets. Shrinkage and air inhibition properties are considerably lower than that of styrene monomers. Replacement of styrene monomers with this monomer allows the resin to be used as an adhesive to polycarbonate.

Further, this invention relates to a vertical liquid pour process which enables the rapid manufacture of bullet resistant glass/plastic laminates without the need for expensive ultra-violet or heat curing ovens. The adhesive cures at temperatures ranging from 60° F. to 90° F. High temperature and high pressure treatments are unnecessary. Laminates produced in this manner with adhesive interlayer will pass all intended ballistic or security tests within a 12 hour period.

DETAILED DESCRIPTION OF THE INVENTION

The polyester oligomer is composed of at least one dibasic acid or acid anhydride which can be selected from the group consisting of adipic acid, phthalic anhydride, and maleic anhydride. Other suitable dibasic acids or acid anhydrides include adipic acid; phthalic anhydride; maleic anhydride; maleic acid; fumaric acid; terephthalic acid (1,4-benzenedicarboxylic acid); 2-chloroterephthalic acid; phthalic acid ( 1,2-benzenedicarboxylic acid) and isophthalic acid (1,3-benzenedicarboxylic acid); 2,6-naphthalene dicarboxylic acid; 2,7-napthalene dicarboxylic acid; and 4,4'-biphenyl dicarboxylic acids or combinations thereof. The polyester is also includes at least one diol. Suitable diols include, for example, dipropylene glycol; 2 -methyl-1,3 -propanediol; ethylene glycol; propylene glycol; diethylene glycol; 2,2-dimethyl-1,3-propanediol; 1,4-butane diol; 1,4-cyclohexane dimethanol; 2,2,4-trimethyl-1,3 -pentane diol; 2-methyl-2-propyl-1,3-propane diol; 1,3 butane diol; 1,5 pentane diol; 1,6-hexane diol; 1,8-octane diol; 1,9-nonane diol; 1,10-decane diol; 1,12-dodecane diol; 1,2-cyclohexanedimethanol; 1,3-cyclohexanedimethanol; 2,2,4,4-tetramethyl-1,3-cyclobutanediol; 1,2-xylene diol; 1,3-xylene diol; and 1,4-xylene diol or any combinations thereof. This produces a linear polyester oligomer. The molecular weight ($M_w$) of the oligomer is between from about 800 to about 2500 as measured by Gel Permeation Chromagraphy, preferably from about 800 to about 2000, and most preferably from about 800 to about 1200. The dibasic acid is from about 20 to about 75% by weight of the total composition, preferably the dibasic acid is from about 40 to about 70% by weight of the total composition, and most preferably the dibasic acid is from about 40 to about 50% by weight of the total composition. The diol is from about 24 to about 79% by weight of the total composition, preferably from about 28 to about 58% by weight of the total composition, and most preferably the diol concentration is from about 48 to about 58% by weight of the total composition.

The refractive index of the polyester is adjusted with propylene glycol addition to the mixture of the dibasic acid and the diol during processing to approximate the refractive index of the float glass and/or the plastic sheets. Flat glass other than float glass can be used in the laminate composite. Since most float glass is a soda-lime-silicate based composition, the refractive index of float glass for example is generally from about 1.50 to about 1.54. Float glass is prefered because of its low price, durability and extremely low defect levels which improve the optics and the economics of the invention. This invention, however, can be adapted to work with any flat glass products known to those skilled in the art. For example high lead content flat glass could be used. For clarification float glass is glass which is produced on a bath of molten metal, whereas flat glass can include float glass but also includes glasses processed for example by casting on a flat surface or glasses produced by any other technique which results in a flat end product.

The refractive index of polycarbonate sheets is also generally from about 1.5 to about 1.54. Because of the similarity of the refractive index of float glass, the polycarbonate sheets are prefered for this invention. This invention, however, can be adapted to work with many transparent plastic sheet products known to those skilled in the art. For example the plastic sheet can be a cast acrylic. Depending on the refractive index of the glass and/or plastic sheets used in the invention, the refractive index of the adhesive polyester can be adjusted to optimize the optics of the composite laminate. With flat glass and/or plastic sheets, the refractive index of the adhesive polyester is preferably adjusted between about 95 to about 100% of that of the flat glass, and most preferably from about 98 to about 100% of that of the flat glass. Most soda-lime-silicate float glasses have a refractive index of about 1.52.

Another example of an oligomer resin system which can be used is similar except the phthalic anhydride is replaced with nadic anhydride. The oligomer(s) are thinned with t-butyl styrene employing mono tert, butyl hydroquinone as inhibitor. Other monomers may be used but t-butyl styrene must constitute 60% of the monomer mix. Fire retardant properties can be achieved by using a 40% monomer mix of dibromostyrene.

In addition to the base resin so described, a second component may be synthesized. This oligomer is comprised of adipic acid, 2-methyl-1,3-propanediol and propylene glycol. A polyester polyol is produced with a molecular weight of about 1000. This product is then reacted with (EtO)$_4$Si to yield a product with a molecular weight of about 3000. Additions of this silane plastizer to the described base resins will improve adhesion to the glass and increase energy absorbing properties of the cured adhesive. Recommended levels are of this second component is from about 0.5 to about 15% by weight of the total composition, preferably from about 1.5 to about 10% by weight, and most preferably from about 1.5 to about 5% by weight of the total composition.

The curing agent is methyl, ethyl ketone peroxide (8% active), 50% with 2,4 pentanedione peroxide, 50% either alone or with other peroxides. Recommended levels are from about 0.5 to about 3% by weight of the total composition, preferably from about 0.5 to about 2% by weight of the total composition, and most preferably from about 0.5 to about 1.5% by weight of the total composition.

Anti-oxidants, ultra-violet screeners, adhesion promoters, and polymerization initiator can be used and in many cases are added to the adhesive polyester composition to improve the properties of the laminate composite. An example of a resin formulation of the adhesive for bullet resistant glass is as follows:

| | |
|---|---|
| Oligomer I (stabilized with 30 ppm m.T.B.H.Q.) | 50.0 pph |
| t-butyl styrene | 38.0 pph |
| styrene | 5.0 pph |
| 2 ethyl hexyl methacrylate | 2.0 pph |
| silylated polyester polyol | 5.0 pph |
| Co naphthenate, 12% (Promoter) | 180.0 ppm |
| Cu naphthenate, 6% (Stabilizer) | 20.0 ppm |
| Lithium octoate, 2% (Promoter) | 1500.0 ppm |
| Nonyl, benzyl trimethyl ammonium chloride | 50.0 ppm |
| Light stabilizer, Tinsurn 328 (Ciba-Geigy) | 1500.0 ppm |
| Tolyl hydroquinone (Inhibitor) | 15.0 ppm |

By T.B.H.Q. is meant tert butyl hydroquinone.

The addition of 1.0–1.5% of the peroxide catalyst described above to this resin formulation will give a gel time of 30–40 minutes and a cure time of about 100 minutes. Testing of the glass clad/polycarbonate laminate can proceed after about 12 hours.

Another resin formulation consists of the following:

| | |
|---|---|
| Oligomer I (stabilized with 30 ppm m.T.B.H.Q.) | 60.0 pph |
| t-Butyl styrene | 35.0 pph |
| styrene | 5.0 pph |
| Co naphthenate, 12% (Promoter) | 180.0 ppm |
| Cu naphthenate, 6% (Stabilizer) | 20.0 ppm |

-continued

| | |
|---|---|
| Lithium octoate, 2% (Promoter) | 1500.0 ppm |
| Nonyl, benzyl trimethyl ammonium chloride | 50.0 ppm |
| Light stabilizer, Tinsurn 328 (Ciba-Geigy) | 1500.0 ppm |
| Tolyl hydroquinone (Inhibitor) | 15.0 ppm |

With this formulation, a glass adhesion promoter (Siloxidane, sold by Union Carbide) must be added at a 1% by total weight in addition to the type and level of catalyst used in the initial formulation. This system is a three component rather than a two component system.

A typical configuration of a level four bullet resistant glass/polycarbonate is illustrated in the Figure and consists of the following:

| |
|---|
| ¼"(G), 30 mils(A), ⅛"(G), 30 mils(A), ⅛"(P.C.), 30 mils(A), ⅛"(P.C.), 30 mils(A), ⅛"(G), 30 mils(A), ⅛"(G) |

A = adhesive
G = glass
P.C. = polycarbonate

The glass and polycarbonate sheet are placed on edge and bonded together on three sides with double sided 30 mil tape. The edges of the glass/polycarbonate are heat bonded with polyisobutyl rubber strips. See the Figure. This invention is not, however, limited to this configuration. Combinations with only plastic sheets, combinations with only flat glass, and any other combination of plastic sheets and flat glass know to those skilled in the art can be used as an effective ballistic or security laminate.

An example of the process or method of making such laminates is as follows. As many as five to ten such configurations can be placed in a row on a wooden stand with slats running perpendicular to the edges of the laminate. The glass/plastic layers are connected on three sides with double sided tape. The edges are heat sealed with polyisobutyl rubber strips and the whole is placed vertically on its edge. Foamed rigid sheets are clamped on either side of the multiple laminates to prevent bowing of the laminates when the resin is introduced. The catalyzed resin is introduced into the space between the glass and plastic layers at the untaped open edge at the top. With the laminate in the vertical position, the resin easily enters the space between the glass and plastic sheets. Entrained air quickly comes to the surface and dissapates. After filling, the mix is allowed to react.

When the resin level reaches the top, further resin addition ceases. Cure temperature range preferably range from about 50° to about 100° F., and most preferably from about 60° F. to about 90° F. and the cure is complete within about a 12 hour period. The foamed sheets are removed about one hour after resin introduction to allow for heat dissipation. The fourth side is heat sealed with a polyisobutyl rubber strip. After the resin has cured, the top part of the laminate is heat sealed with polyisobutyl rubber strips. After 12 hours of curing, the laminate is ready for testing. The advantages of this fabrication technique include:
1. Ambient temperature cure.
2. Single rapid resin pour with rapid air removal.
3. Two component mix or optional three component mix.
4. Inexpensive fabrication equipment.

The production of these laminates is, however, not limited to just this method and can be produced by any of a number of methods known to those skilled in the art.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Experimental Details

Base Resin Synthesis a. Four base resins are included as examples. Only the glycol type varies in the process formulations.
b. Process procedures vary.
c. Thinning monomer is t-butyl styrene with 30 ppm of t-butyl hydroquoine in each case.
d. Process specifications for each example are as follows:
 1. Oligomer color: 50 A.P.H.A. max.
 2. Acid number range: 14–25.
 3. Viscosity (Gardner Bubble) range at 60% solid and 40% styrene: B-C.
 4. Molecular weight (G.P.C.) range: 900–1200.
 5. Residual glycol <1%.

Example I

Base Resin-flexible

Oligomer Formation

| Reactants | moles | mol. wt. | mole wt. | % charge | gms. |
|---|---|---|---|---|---|
| water | 1.25 | 18.0 | 22.5 | 1.49 | 59.6 |
| maleic anhydride | 1.00 | 98.0 | 98.0 | 6.48 | 259.2 |
| phthalic anhydride | 1.60 | 148.0 | 236.8 | 15.66 | 626.4 |
| adipic acid | 3.00 | 146.0 | 438.0 | 28.96 | 1158.4 |
| dipropylene glycol | 4.50 | 134.0 | 603.0 | 39.87 | 1594.8 |
| propylene glycol | 1.50 | 76.0 | 114.0 | 7.54 | 301.6 |
|  |  |  | 1512.3 | 100.00 | 4000.0 gms. |

Stabilizer: 100 ppm (ethoxylated phosphoric acid); Albrastab 190 (Albright/Stevens Corp.)

Example II

Base Resin-flexible

| | moles | mol. wt. | mole wt. | % charge | gms. |
|---|---|---|---|---|---|
| water | 1.25 | 18.0 | 22.5 | 1.71 | 68.4 |
| maleic anhydride | 1.00 | 98.0 | 98.0 | 7.46 | 298.4 |
| phthalic anhydride | 1.60 | 148.0 | 236.8 | 18.07 | 722.8 |
| adipic acid | 3.00 | 146.0 | 438.0 | 33.33 | 1333.2 |
| 2 methyl 1, 1,3 propane diol | 4.50 | 90.0 | 405.0 | 30.81 | 1232.4 |
| propylene glycol | 1.50 | 76.0 | 114.0 | 8.67 | 346.8 |
| | | | 1314.3 | 100.00 | 4002.0 gms. |

Stabilizer: 100 ppm (ethoxylated phosphoric acid) -Albrastab 190 (Albright/Stevens Corp.)

Calc. Theo. $H_2O$ removed = 539.8 gms.

Cook Procedure (Examples I and II)

All ingredients are added to a 4 L. resin kettle equipped with mechanical stirrer, packed column, thermocouple, and an inert gas blanket inlet. The mix is heated with an electric mantle while stirring under an inert gas blanket at 200° C. until the acid number of the mix is 50 or below. An inert gas sparge is applied and the mix is cooked until the acid number is 15 or below and the Gardner viscosity is between a B and C (60% solids/40% styrene).

The solids are cooled to 150° C. and thinned with 25% t-butyl styrene with additional cooling. Tolylhydroquinone (30 ppm based on total resin mix) is added to the t-butylstyrene prior to thinning.

Example III

Base Resin-Semi-flexible

| | moles | mol. wt. | mole wt. | % charge | gms. |
|---|---|---|---|---|---|
| water | 2.25 | 18.0 | 40.5 | 2.81 | 112.4 |
| maleic anhydride | 2.0 | 98.0 | 196.0 | 13.57 | 542.8 |
| adipic acid (Exxon) | 3.60 | 146.0 | 438.8 | 30.33 | 1218.2 |
| dicyclopentadiene | 0.40 | 132.0 | 52.6 | 3.64 | 145.6 |
| dipropylene glycol | 4.50 | 134.0 | 603.0 | 41.76 | 1670.4 |
| propylene glycol | 1.50 | 76.0 | 114.0 | 7.89 | 315.6 |
| | | | 144.1 | 100.00 | 4000.0 |

Stabilizer: 100 ppm (ethoxylated phosphoric acid) Albrastab 190 (Albright/Stevens)

Calc. Theo. water removed = 467.0 gms

Example IV

| | moles | mol. wt. | mole wt. | % charge | gms. |
|---|---|---|---|---|---|
| water | 2.25 | 18.0 | 40.5 | 3.20 | 128.0 |
| maleic anhydride | 2.00 | 98.0 | 196.0 | 15.47 | 618.8 |
| adipic acid (Exxon) | 3.60 | 146.0 | 438.8 | 34.57 | 1382.8 |
| dicyclopentadiene | 0.40 | 132.0 | 52.6 | 4.15 | 166.0 |
| 2-methyl, 1,3 pentane diol | 6.00 | 90.0 | 540.0 | 42.62 | 1704.8 |
| | | | 1267.1 | 100.01 | 4000.4 |

Base Resin-semi-flexible

Stabilizer: 100 ppm (ethoxylated phosphoric acid) - Albrastab 190 (Albright/Stevens)

Calc. Theo. Water removed = 582.5 gms

Cook Procedure (Examples III and IV)

All ingredients are added except dicyclopentadiene. With the same type of equipment set up as in Examples I and II, the mix is heated to 200° C. and reaction water is removed until acid number is 50 or below. At this point the process is cooled to 170° C. and the dicyclopentadiene is added in 2 shots over a 45 minute period. After a 2 hour hold period at 170°–180° C., the whole is placed on main vent and sparged until the acid number is 14–18 and the Gardner-Holt viscosity ay 60% solid and 40% styrene equals B-C. From this point on all else remains the same as in Procedures for Examples I and II.

Polyester Polyol-Silyated

Example V

|  | moles | mol. wt. | mole wt. | % charge | gms |
|---|---|---|---|---|---|
| dimethyl adipate | 1.000 | 174 | 174.0 | 46.51 | 1860.4 |
| diethylene glycol | 1.250 | 106 | 132.5 | 35.42 | 1416.8 |
| tetraethoxy silane | 0.325 | 208 | 67.6 | 18.07 | 722.8 |
|  |  |  | 374.1 | 100.00 | 4000.0 |

Catalyst: Titanate catalyst: 500 ppm (Tyzor T.E.-Dupont)
Calc. Theo. methanol distillate: 684.2 gms
Calc. Theo. ethanol distillate: 22.70 gms Example VI

|  | moles | mol. wt. | mole wt. | % charge | gms |
|---|---|---|---|---|---|
| dimethyl adipate | 1.00 | 174 | 174.0 | 49.14 | 1965.6 |
| 2-methyl, 1,3 propane diol | 1.250 | 90 | 112.5 | 31.77 | 1270.8 |
| tetraethoxy silane | 0.325 | 208 | 67.6 | 19.09 | 763.6 |
|  |  |  | 354.1 | 100.00 | 4000.0 |

Catalyst: Titanate Catalyst (Tyzor T.E.-Dupont)
Calc. Theoretical methanol distillate: 684.2 gms
Calc. Theoretical ethanol distillate: 22.70 gms Process Procedure (Examples V and VI)

All ingredients except tetra ethoxy silane are added to a 4 L. resin kettle equipped with mechanical stirrer, packed column, thermocouple, and an inert gas blanket inlet. The mix is heated with an electric mantle while stirring under an inert gas blanket at 200° C. until the Gardner-Holt viscosity is A-B. The whole is cooled to 50°–60° C. and the silane is slowly added to the whole. After a 2 hour hold period, the kettle is placed on main vent and the mix is sparged until the Gardner-Holt viscosity is G-H. The silylated polyester polyol is cooled to 60° C. and discharged.

Cook Specifications (Example V and VI)

1. Polyol Color: 100 A.P.H.A. max.
2. Viscosity (Brookfield) at 25° C.:1600–1800 cps
3. Molecular Weight (G.P.C.) range: 3000–4000.
4. Residual glycol>0.1%

Typical Glass Lamination Resin Formulations for Glass Clad/Plastic Applications, e.g. polycarbonate and or acrylic sheet

| Example VII - non-fire retardant | |
|---|---|
| 1. Example I (25% t-butyl styrene) | 66.7 pph |
| 2. t-Butyl styrene (Deltex) | 21.3 pph |
| 3. Styrene (Monsanto) | 5.0 pph |
| 4. 2-ethyl hexyl methacrylate (Bayer) | 2.0 pph |
| 5. Example VI | 5.0 pph |
| 6. Cobalt napthenate, 12% active (Mooney) | 180.0 ppm |
| 7. Copper napthenate, 6% active (Mooney) | 20.0 ppm |
| 8. Lithium octoate, 2% active (Mooney) | 1500.0 ppm |
| 9. Nonyl Benzyl, trimethyl ammonium chloride | 50.0 ppm |
| 10. Tinuvin 328 (Ciba/Geigy) | 1500.0 ppm |
|  | 100.3250 |

Specifications:
1. Color, A.P.H.A. — 50 max.
2. Viscosity, Brookfield, 25 C. — 150 cps.
3. Refractive Index — 1.5250–1.5270

Reactivity:
1 gram of a mixture of 50% methyl ethyl ketone peroxide (8% acitve) + 50% 2,4-pentanedione peroxide with 99 gms of above formulation.
Gel time = 40 minutes
Peak, °F. = 115
Cure time = 100 minutes
Total time = 140 minutes Bullet resistant laminates made from the above are capable of passing Level 1 through Level 4 depending on configuration of glass and polycarbonate sheets, (AS-12).

| Example VIII - fire retardant | |
|---|---|
| 1. Example II (25% tbutyl styrene) | 66.7 pph |
| 2. Dibromostyrene | 25.3 pph |
| 3. 2-ethyl hexxl methacrylate (Bayer) | 3.0 pph |
| 4. Example VII | 5.0 pph |
| 5. Cobalt Naphthenate, 12% active (Mooney) | 180.0 ppm |
| 6. Copper Naphthenate, 6% active (Mooney) | 20.0 ppm |
| 7. Lithium octoate, 2% active (Mooney) | 1500.0 ppm |
| 8. Nonyl Benzyl, trimethyl ammonium chloride | 50.0 ppm |
| 9. Tinuvin 328 (Ciba-Geigy) | 1500.0 ppm |
|  | 100.3250 |

Above formulation is designed for attack glass applications.

Specifications:
1. Color, Gardner — 2 max.
2. Viscosity, Brookfield, 25 C. — 250 cps
3. Refractive Index — 1.5320–1.5360

Reactivity:
1 gm mixture of 75% M.F.F.P. (8% active); 25% 2,4 Pentadione peroxide
99 gms of F.R. Formulation
Ge; Time: 55 minutes
Peak Exotherm, 0° F.: 125 F.
Cure time: 140 minutes
Total Time: 195 minutes

| Example IX - Casting Application | |
|---|---|
| 1. Example IV | 66.7 pph |
| 2. t-butyl styrene (Deltec) | 21.3 pph |
| 3. Styrene (Monsanto) | 5.0 pph |
| 4. 2-ethyl hexyl methacrylate (Bayer) | 2.0 pph |
| 5. Example VI | 5.0 pph |
| 6. Cobalt naphthenate, 12% Active (Mooney) | 200.0 ppm |
| 7. Cu naphthenate, 6% active (Mooney) | 20.0 ppm |
| 8. Lithium octoate, 2% active | 1500 ppm |

-continued

| | |
|---|---|
| (Mooney) | |
| 9. Tinuvin 328 (Ciba-Geigy) | 1500 ppm |
| | 100.3250 |
| Specifications | |
| 1. color A.P.H.A. | 100 max |
| 2. Viscosity, Brookfield, 25 C. | 150 cps |
| 3. Refractive Index | 1.5250–1.5270 |
| Reactivity: | |
| 1 gm of a mixture of 75% M.E.K.P. (8% active) | |
| 25% 2,4 pentane dione perioxide | |
| 99 gms of Casting formulation | |
| Gel Time = 25 minutes | |
| Peak Time, F. = 130 | |
| Cure Time = 90 minutes | |
| Total Time = 115 minutes | |

The above formulation can be used in thick casting applications for bullet resistance.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method for the preparation of an adhesive polyester pre-polymer which does not etch polycarbonate sheets, comprising:

preparing a linear polyester oligomer by reacting a mixture comprising at least one dibasic acid selected from the group consisting of adipic acid, phthalic anhydride, and maleic anhydride with at least one diol selected from the group consisting of dipropylene glycol and 2-methyl-1,3-propanediol to obtain a linear polyester oligomer having a molecular weight between about 900 and 1,200 measured by gel permeation chromatography;

adjusting the refractive index of said linear polyester oligomer to a refractive index from about 1.50 to about 1.54 by adding propylene glycol to said mixture of said dibasic acid and said diol;

and thinning said linear polyester oligomer with at least one monomer capable of cross-linking said linear polyester, said at least one monomer containing at least 60% by weight of t-butyl styrene, to obtain an adhesive polyester pre-polymer which does not etch polycarbonate sheets.

2. The method of preparation of an adhesive polyester pre-polymer set forth in claim 1, including up to 40% by weight of dibromostyrene in said at least one monomer.

3. An adhesive polyester which does not etch polycarbonate sheets prepared by cross-linking a prepolymer prepared by the method of claim 1.

4. An adhesive polyester which does not etch polycarbonate sheets prepared by cross-linking a prepolymer prepared by the method of claim 2.

5. The method for the preparation of an adhesive polyester pre-polymer set forth in claim 1, including adding a second polyester oligomer to said mixture prepared by reacting adipic acid, 2-methyl-1,3-propanediol and propylene glycol to obtain a linear oligomer having a molecular weight of about 1000, and reacting said linear oligomer with $(C_2H_5O)_4Si$ and obtain a said second polyester oligomer having a molecular weight of about 3000.

6. An adhesive polyester which does not etch polycarbonate sheets prepared by cross-linking a prepolymer prepared by the method of claim 5.

7. A method for the preparation of an adhesive polyester pre-polymer which does not etch polycarbonate sheets comprising:

preparing a linear polyester oligomer by reacting a mixture comprising at least one dibasic acid selected from the group consisting of adipic acid, nadic anhydride, and maleic anhydride with at least one diol selected from the group consisting of dipropylene glycol and 2-methyl-1,3-propanediol to obtain a linear polyester oligomer having a molecular weight between about 900 and 1,200 measured by gel permeation chromatography;

adjusting the refractive index of said linear polyester oligomer to a refractive index from about 1.50 to about 1.54 by adding propylene glycol to said mixture of said dibasic acid and said diol;

and thinning said linear polyester oligomer with at least one monomer capable of cross-linking said linear polyester, said at least one monomer containing at least 60% by weight of t-butyl styrene, to obtain an adhesive polyester pre-polymer which does not etch polycarbonate sheets.

8. The method for the preparation of an adhesive polyester pre-polymer set forth in claim 7, including up to 40% by weight of dibromostyrene in said at least one monomer.

9. An adhesive polyester which does not etch polycarbonate sheets prepared by cross-linking a prepolymer prepared by the method of claim 7.

10. An adhesive polyester which does not etch polycarbonate sheets prepared by cross-linking a prepolymer prepared by the method of claim 8.

11. The method for the preparation of an adhesive polyester pre-polymer set forth in claim 7, including adding a second polyester oligomer to said mixture prepared by reacting adipic acid, 2-methyl-1,3-propanediol and propylene glycol to obtain a linear oligomer having a molecular weight of about 1000, and reacting said linear oligomer with $(C_2H_5O)_4Si$ and obtain said second polyester oligomer having a molecular weight of about 3000.

12. An adhesive polyester which does not etch polycarbonate sheets prepared by cross-linking a prepolymer prepared by the method of claim 11.

* * * * *